(12) United States Patent
Horowitz et al.

(10) Patent No.: US 8,599,203 B2
(45) Date of Patent: Dec. 3, 2013

(54) SYSTEMS AND METHODS FOR PRESENTING VISUALIZATIONS OF MEDIA ACCESS PATTERNS

(75) Inventors: Steven Horowitz, Oakland, CA (US); Jeffery Bennett, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 1317 days.

(21) Appl. No.: 11/961,013

(22) Filed: Dec. 20, 2007

(65) Prior Publication Data
US 2009/0160859 A1 Jun. 25, 2009

(51) Int. Cl.
*G06T 11/20* (2006.01)

(52) U.S. Cl.
USPC ........................................................ 345/440

(58) Field of Classification Search
CPC .................................................. G06T 11/206
USPC ....................................................... 345/440
See application file for complete search history.

(56) References Cited

U.S. PATENT DOCUMENTS

| | | | | |
|---|---|---|---|---|
| 4,156,914 A | * | 5/1979 | Westell | 382/264 |
| 5,136,690 A | * | 8/1992 | Becker et al. | 715/853 |
| 5,623,590 A | * | 4/1997 | Becker et al. | 345/440 |
| 6,018,344 A | * | 1/2000 | Harada et al. | 345/440 |
| 6,054,987 A | * | 4/2000 | Richardson | 345/440 |
| 6,104,410 A | * | 8/2000 | Wong | 345/440 |
| 2007/0016435 A1 | * | 1/2007 | Bevington | 705/1 |
| 2008/0005677 A1 | * | 1/2008 | Thompson | 715/744 |

OTHER PUBLICATIONS

Stephen E. Lamm, Daniel A. Reed, Will H. Scullin; Real-time geographic visualization of World Wide Web traffic; May 1996; Proceedings of the Fifth International World Wide Web Conference May 6-10, 1996; Computer Networks and ISDN Systems; vol. 28, Issues 7-11, May 1996, pp. 1457-1468.*

* cited by examiner

*Primary Examiner* — Jeffery A Brier
(74) *Attorney, Agent, or Firm* — James J. DeCarlo; Greenberg Traurig, LLP (57) ABSTRACT

Disclosed are systems and methods for presenting media access patterns to a user. Requests are received for a media item from consumers located in a first geographic area, or media access information is otherwise collected. A first plurality of media accesses are recorded in a logging database associated with consumers who requested the media item and who are located in the first geographic area. Requests are received for the media item from consumers located in a second geographic area. A second plurality of media accesses associated with consumers who requested the media item and who are located in the second geographic area are recorded in the logging database. A first graphical representation of the first plurality of media accesses is displayed on a map. A second graphical representation of the second plurality of media accesses is also displayed on the map.

31 Claims, 6 Drawing Sheets

SYSTEMS AND METHODS FOR PRESENTING VISUALIZATIONS OF MEDIA ACCESS PATTERNS

BACKGROUND

1. Field

This disclosure relates to online media access. In particular, this disclosure relates to systems and methods for providing visual indications of media access patterns to users.

2. Background

Media consumers are increasingly accessing media, such as music and video, through the World Wide Web, and the Internet in general. As the Internet becomes the new forum for artist's success, media access patterns in the Internet have become more important. Record labels, artists, and media producers in general are now more focused than ever on media access of consumers on the Internet. In addition, consumers also want to know what media other consumers are listening to, viewing, and accessing online.

SUMMARY

The disclosure herein describes, in an embodiment, logging access data in a media access log representing a first plurality of media accesses associated with consumers who requested a media item and who are located in a first geographic area, logging access data in the media access log representing a second plurality of media accesses associated with consumers who requested the media item and who are located in a second geographic area, processing the access data in response to request for a visual representation of the consumers' media accesses, and communicating data for visual rendering on a display of a user device, the visual display data when rendered displaying on a map a first graphical representation of the first plurality of media accesses, the first graphical representation being displayed in association with a graphical representation of the first geographical area on the map, and a second graphical representation of the second plurality of media accesses, the second graphical representation being displayed in association with a graphical representation of the second geographical area on the map. In other embodiments the first graphical representation and the second graphical representation comprise a histogram or a heat map. In other embodiments the heat map is displayed with the first graphical representation in a first color if a number of the first plurality of media accesses falls within a first range, the heat map being displayed with the first graphical representation in a second color if the number of the first plurality of media accesses falls within a second range, or the heat map can be displayed with the second graphical representation in a first color if the number of the second plurality of media accesses falls within a first range, the heat map being displayed with the second graphical representation in a second color if the number of the second plurality of media accesses falls within a second range. In other embodiments the disclosure describes providing the media item to the consumers who are located in the first geographic area, and providing the media item to the consumers who are located in the second geographic area, as well as determining whether a consumer from the plurality of consumers is associated with the first geographic area if an Internet address associated with a computing device being utilized by the consumer corresponds to the first geographic area, or further determining whether a consumer from the plurality of consumers is associated with the second geographic area if an Internet address associated with a computing device being utilized by the consumer corresponds to the second geographic area. Also disclosed is determining whether a consumer from the plurality of consumers is associated with the first geographic area if a profile of the consumer includes geographic data related to the first geographic area, or whether a consumer from the plurality of consumers is associated with the second geographic area if a profile of the consumer includes geographic data related to the second geographic area. Also disclosed is determining a number of accesses to the media item in each of the first and second geographic areas over a time period, or wherein the first and second geographic areas represent zip code areas, or wherein the processing step further comprises applying a two-dimensional Gaussian filter to said access data, or normalizing the access data, or filtering the access data based upon user selected filtering criteria, or scaling the access data. In other embodiments the processing steps described herein, and the communicating steps described herein, are performed at preselected times, and the visual display data comprises a static image. In other embodiments a method is described comprising for storing data representing a first plurality of media accesses associated with consumers who requested the media item and who are located in a first geographic area, storing data representing a second plurality of media accesses associated with consumers who requested the media item and who are located in a second geographic area, outputting an image displaying on a map a first graphical representation of the first plurality of media accesses, the first graphical representation being displayed in association with a graphical representation of the first geographical area on the map, outputting an image displaying on the map a second graphical representation of the second plurality of media accesses, the second graphical representation being displayed in association with a graphical representation of the second geographical area on the map. In embodiments the first graphical representation and the second graphical representation comprise a histogram or a heat map. The method may further include gathering demographic information about the consumers and utilizing the demographic information in said processing step as part of a filtering process so as to tailor the processing of the access data according to selected consumer demographic information. Also disclosed is a system for presenting media access patterns to a user that includes a logging module that stores in a media access logs database data relating to a first plurality of media accesses associated with consumers who requested the media item and who are located in a first geographic area, the logging module further configured to store in the media access logs database data relating to a second plurality of media accesses associated with consumers who requested the media item and who are located in a second geographic area, and a user interface module that communicates, for visual display on a user device, a map depicting a first graphical representation of the first plurality of media accesses, the first graphical representation being displayed in association with a graphical representation of the first geographical area on the map, and a second graphical representation of the second plurality of media accesses, the second graphical representation being displayed in association with a graphical representation of the second geographical area on the map. In embodiments the system can include a media database and a media access module, the media access module communicating with the logging module to pass access data to the logging module concerning media accesses from said media database, or a consumer profiles database storing demographic information about consumers having access to the system, the consumer profile database being in communication with the logging module and a reporting module, such that the reporting module can process the access data and the consumer demographic information for building the map to be communicated by the user interface module. In still other embodiments the disclosure describes a visibly displayed user interface for displaying media access patterns, that includes a map that displays a first graphical representation of a first plurality of media accesses associated with consumers in a first geographic area of the map, the first graphical representation being displayed in association with a graphical representation of the first geographical area on the map, thereby depicting a media access pattern of consumers in the first geographic area, and the map display further comprises the display of a second graphical representation of a second plurality of media accesses associated with consumers in a second geographic area, the second graphical representation being displayed in association with a graphical representation of the second geographical area on the map, thereby depicting a media access pattern of consumers in the second geographic area. In embodiments the user interface can also include a user input area via which a user can select the first graphical representation and the second graphical representation to be displayed as histograms, as well as a user input area via which a user can select wherein the first graphical representation and the second graphical representation to be displayed as a heat map. In other embodiments the user interface can include a slider that permits a user of the interface to select a period of time in which the first plurality of media accesses and the second plurality of media accesses took place, or an input area via which a user can elect to view the consumer media access patterns of consumers in relation to a particular media item, or an input area via which a user can elect to view the consumer media access patterns of consumers in relation to a particular media item genre, or an input area via which a user can elect to view the consumer media access patterns of consumers in relation to a particular media item parameter, as well as an input area via which a user can elect to view the consumer media access patterns of consumers in accordance with an elected filtering technique or a user input area via which the user can alter the perspective at which the map is displayed.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

The systems and methods described herein provide a user with information regarding media access patterns of a defined consumer base in one or more geographic areas. For example, a user can select a media item (such as music, video, image, text, streaming media, internet radio station, podcasts or other digitally stored information), or media item descriptor information, and be provided with a visual representation of media access patterns of the selected media item in one or more geographic areas.

Media access as the term is used herein is defined as events corresponding to a consumer experiencing, interacting with or obtaining an item of media, and can comprise activities such as downloading a media item such as a song, video, image, article, ebook, podcast or news item, streaming music or video or other audio or visual work, subscribing to RSS feeds, reading blogs, viewing digital images, listening to Internet radio or satellite channels, and watching Internet video clips, or other electronic media item now known or to become known. In addition, media access patterns can include data such as the number of downloads and streams accessed by consumers in a geographic area, or a number of plays or views or other discernable ways of tracking whether a consumer has experienced, downloaded or purchased an item of media in a geographic area in a particular timeframe.

Consumers as described herein are generally subscribers or entities that access media from a media provider. The media provider system can be configured to download, stream and in general provide media access to the consumer. In addition, the media provider system can further be configured to track, monitor, or log media access activity by the consumer at the consumer's media rendering or playing device, such as a personal computer, portable media player, wireless device, satellite receiver, cell phone or other electronic device capable of communicating information concerning media being accessed by the consumer at a particular place and/or time.

As described further below, users can be individuals or entities that query the media provider system in order to determine media access patterns. The user establishes parameters for searching media access patterns. Parameters can include one or more descriptor information elements for a media item, such as title, artist, album, etc. In addition, the user can enter data manipulation parameters for scaling, normalizing and filtering results. For example, scaling can include applying square roots, logarithms and other statistical analysis techniques to the data. In another example, normalizing can include dividing the data by the total number of consumers or media item accesses in the geographical area, or other factor. In yet another example, filtering parameters can include age, gender, ethnicity and other demographic or psychographic attributes of consumers accessing the media item.

Users can be record labels, bands, producers, etc., or any other interested party that might be interested in determining media access patterns in order to assess the success or popularity of a song, video, artist, etc. Of course, a user of the system can also be a consumer, or any other person or entity to which access to the systems and methods described herein is granted. Thus, once the user determines media access patterns, the user can become a consumer that requests similar media from the media provider.

Figure 1:
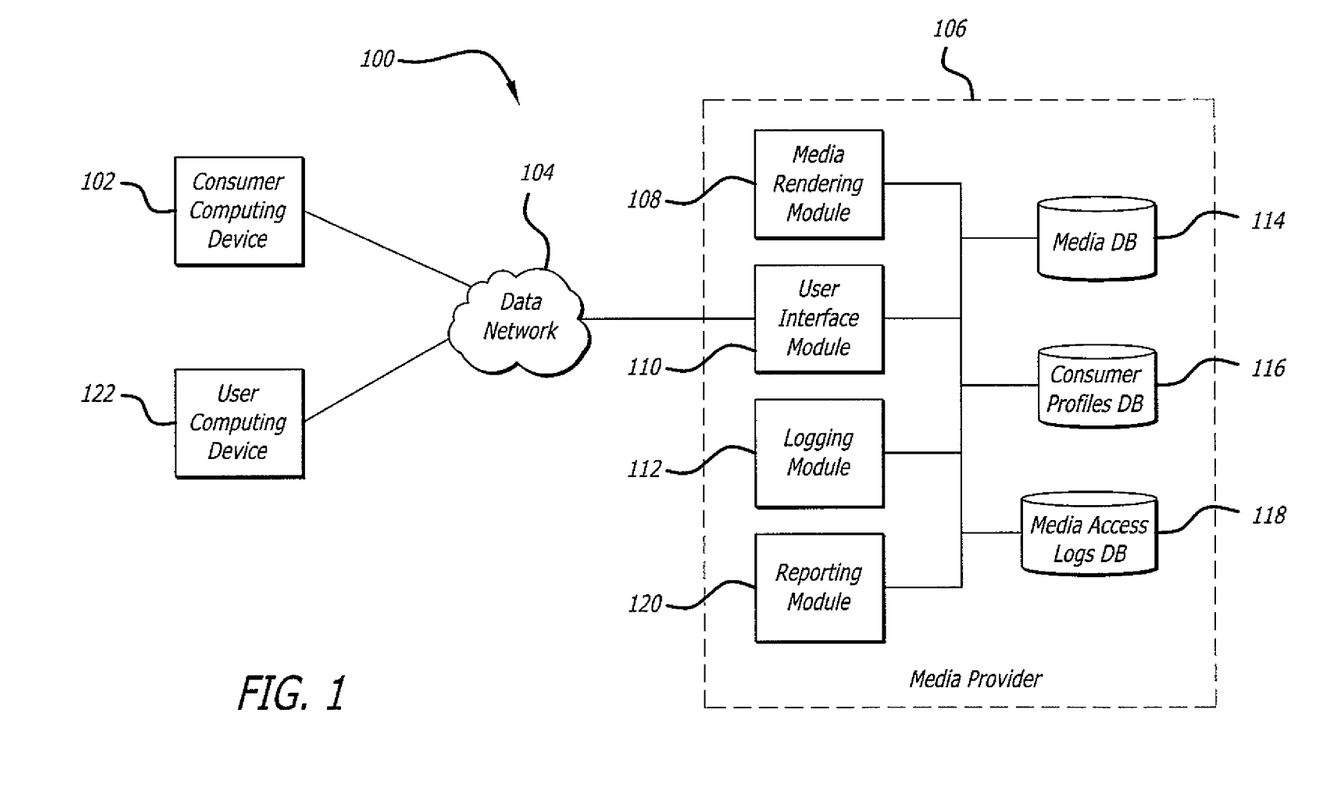
FIG. 1 depicts an example of a system for communicating media access patterns to one or more users according to one embodiment.

FIG. 1 depicts a system for logging media access patterns of consumers according to one embodiment. In addition, the media access patterns can be communicated to one or more users who select a specific media item, data manipulation parameters, and/or time periods as search criteria of media access patterns.

Media access patterns can be collected and logged in multiple ways. In one embodiment, a media consumer communicates with a media provider 106 through a data network 104. The consumer can utilize a consumer computing device 102 to submit requests for media such as music or video. The consumer can further utilize the consumer computing device 102 to receive media transmitted over the data network 104 and received at the consumer computing device 102. For example, the consumer can request a music file from the media provider 106 by making a request at the interface module 110. The interface module 110 can be configured to provide one or more user interface functionalities and components that permit the consumer to input data and receive media data.

In one embodiment, a consumer can request a media file from the interface module 110. In another embodiment, the user can request or obtain a series of media files, such as a playlist, or via an Internet station or channel. Upon receiving the playlist, the interface module 110 can be configured to relay the user commands to the media access module 108. The media access module 108 can be configured to access media files stored in a media database 114. Media files stored in the media database 114 can include by way of non-limiting example music, video, images, text, podcasts, ebooks, articles, and in general media files in digital media formats currently known, or to become known in the future. Upon receiving the selection command from the interface module 110, the media access module 108 searches the media database 114 and retrieves the correct media file or files corresponding to the request by the consumer. The media access module 108 can be configured to further communicate with the interface module 110 so as to transmit the retrieved media file to the consumer computing device 102. In other embodiments the information regarding media accessed by a consumer can come from a consumer computing device 102, or from other sources or media services (not shown) via data network 104, which would provide information to the logging module 112 (either directly or through the interface module 110) so as to enable the logging module 112 to collect information concerning media items accessed by a consumer from sources other than through the media or service provider providing the systems and methods described herein. In other words the media access logs that comprise the data stored in media access logs database 118 and by which access patterns are analyzed and displayed in manners further described below can be configured to be agnostic as to the source of the log data that represents a consumer's media accesses.

In addition, the media access module 108 can further be configured to communicate with a logging module 112. The communication transmitted from the media access module 108 can comprise information related to the media requested by the consumer from the consumer computing device 102. For example, the media access module 108 can convey information to the logging module 112 such as the title of a song or video, name of an artist, name of the corresponding album, track number, genre information, etc. In addition, the media access module 108 can further convey the date and time of the start of media transmission. Furthermore, the media access module 108 can convey the user identifier corresponding to the consumer requesting the media file or files.

In one embodiment, upon the logging module 112 receiving information indicative of the consumer identity, the logging module 112 can store consumer updated data in the consumer profiles database 116. The consumer data can be for example data obtained from the user interface module 110, or the media access module 108. In one example, the consumer data can include the geographic location of the consumer. The geographic location of the consumer is retrieved from the consumer profile at the consumer profiles database 116. For example, the media provider 106 can require a subscription or otherwise a registration process in order to allow the consumer to receive media from the media provider 106. During the registration process a consumer profile typically must be entered by each consumer that accesses media. Information in the consumer profile can include consumer location such as zip code information, area code information and physical address, as well as age, gender, ethnicity and media preferences, among other types of demographic or personal information.

In another embodiment, the logging module 112 can determine the location of the consumer by inquiring from the interface module 110 or directly from the consumer computing device 102 the IP address, or any other identifier, of the consumer computing device 102. Known lookup tables and/or software configured to map IP addresses to geographic locations such as zip codes and latitude/longitude coordinates can be utilized to determine the geographic location of the consumer.

Once the logging module 112 has collected and gathered information regarding the requested media, media characteristics, media transmission start time, consumer user identifier, and/or geographic location of the consumer, the logging module 112 can store or cause to be stored the collected information representing media access events in the media access logs database 118. As such, the media access logs database 118 stores a collection of media accesses as well as geographic and optionally time period information associated with each media access. In one embodiment, the media access logs database 118 can be accessed by a reporting module 120 to retrieve media access patterns data.

In addition, the media access logs database 118 can further include an indicator or identifier that associates each media access with a consumer profile in the consumer profiles database 116. In one example, the reporting module 120 can then access the consumer profiles database 116 to obtain other media accesses associated with each consumer. In another example, the reporting module 120 can access the consumer profiles database 116 to determine the age of the consumers who have associated media accesses in a given geographic area at selected times or over a period of time. In another example, the reporting module 120 can access the consumer profiles database 116 to determine the gender of the consumers who have associated media accesses in a given geographic area at selected times or over a period of times.

Alternatively, the media access logs database 118 can store information necessary for the reporting module to create reports and communicate the reports to one or more users requesting such reports. For example, the media access logs database 118 can include associated consumer information in relation to each media access stored in the media access logs database 118. In one example, a media access associated with a consumer can be stored in the media access logs database 118 as a single entry that contains information related to the media content requested by the consumer as well as consumer profile information associated with the consumer requesting the media content.

In another embodiment, the media access logs database 118 can further be configured to store the number of consumers that access a media item, or the number of media accesses of a media item.

Once the media access logs database 118 is populated with entries corresponding to media accesses associated with one or more consumers, the reporting module 120 can interact with the interface module 110 to further allow users to view consumer's media access patterns. In addition, a user viewing media access patterns of consumers can also be a media consumer who views the media access patterns of consumers.

Thus, for example, a user at the user computing device 122 can access the interface module 110 to request a report on consumer media access patterns in one or more geographic areas.

In one example, the media descriptor or parameter information entered as part of the search can be for songs by the artist "Prince." Upon receiving the reporting request, the reporting module 120 can utilize search criteria to retrieve data that includes consumer media accesses where the media's artist is "Prince." For example, the reporting module 120 can be configured to search and retrieve data logged in the media access logs database 118. The relevant logged data can include one or more records of previous media accesses associated with consumers located in multiple geographic locations at selected times or over a period of time.

Once the reporting module 120 receives a list of relevant logged media accesses, the reporting module can then further filter this information in order to summarize the information into a list of relevant results that can then be provided to the user requesting the report. For example, the reporting module 120 can filter the retrieved data by certain demographic parameters such as age, gender and ethnicity of the consumers. In another example, the reporting module 120 can filter the data based on the date and time of the media accesses associated with the consumer media request. In another example, the reporting module 120 can also be configured to scale the data based on operations such as logarithm of a given base, and/or square root. In yet another example, the reporting module 120 can also be configured to normalize the data based on operations such as dividing by the total number of consumers or media accesses in a given geographic area. Reporting Module 120 communicates with media access logs database 118, consumer profiles database 116 and user interface module 110 to process the log data and visually present it in the manners described herein.

While various databases have been described herein, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. For example, the media access logs database 118, the consumer profiles database 116, and the media database 114 can be implemented using any type of data repository. Likewise, while various modules have described herein, one skilled in the art will recognize that each of the aforementioned modules can be combined into one or more modules, and be located either locally or remotely. Each of these modules can exist as a component of a computer program or process, or be implemented as a combination of hardware, software or firmware, or be standalone computer programs or processes recorded in a data repository.

Figure 2:
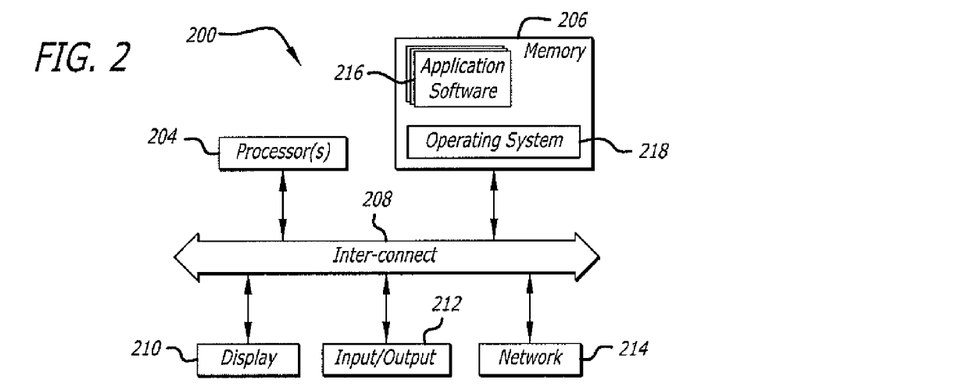
FIG. 2 depicts a component diagram of an example of data processing system according to one embodiment.

FIG. 2 depicts a component diagram of one example of a computing device 200. The user computing device can be utilized to implement one or more computing devices, computer processes, or software modules described herein. In one example, the user computing device 200 can be utilized to process calculations, execute instructions, and receive and transmit digital signals, as required by the user computing device 200. In one example, the user computing device 200 can be utilized to process calculations, execute instructions, and receive and transmit digital signals, as required by user interface logic, video rendering logic, decoding logic, or search engines as discussed below.

Computing device 200 can be any general or special purpose computer now known or to become known capable of performing the steps and/or performing the functions described herein, either in software, hardware, firmware, or a combination thereof.

Computing device 200 includes an interconnect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such as input ports 212 and output ports 210. Input ports 212 and output ports 210 can communicate with I/O devices such as mice keyboards, modems, network interfaces, printers, scanners, video cameras and other devices. In addition, the output port 210 can further communicate with the display 104.

Furthermore, the interconnect 208 can include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The interconnect 208 can also include a network connection 214.

The memory 206 can include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory can also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure can be stored in memory 206 or obtained through input ports 212 and output ports 210.

In general, routines executed to implement one or more embodiments can be implemented as part of an operating system 218 or a specific application, component, program, object, module or sequence of instructions referred to as application software 216. The application software 216 typically comprises one or more instruction sets, stored on a computer readable medium that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media and optical storage media (e.g., Compact Disk Read-Only Memory (CD ROMS), Digital Versatile Disks, (DVDs), etc.), among others. The instructions can be embodied in digital and analog communication links for electrical, optical, acoustical or other forms of propagated signals, such as carrier waves, infrared signals, digital signals, etc.

Figure 3:
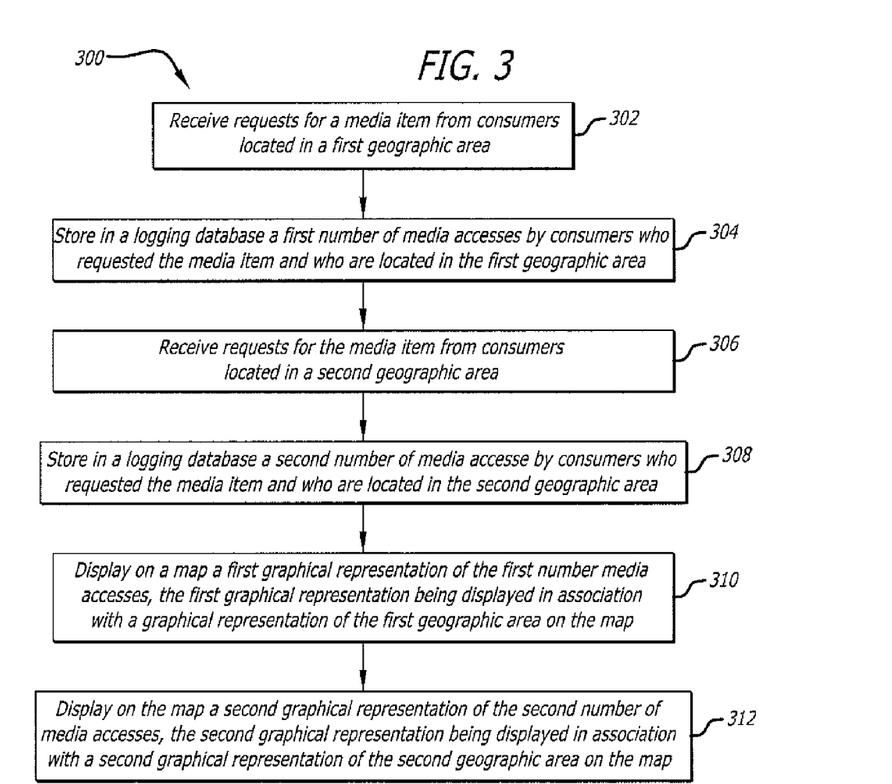
FIG. 3 depicts a flow diagram of a process for displaying media access patterns according to one embodiment.

FIG. 3 depicts a flow diagram of a process for logging, processing and displaying media access patterns according to one embodiment. Process block 300 represents functions performed by the modules 108, 110, 112 and 120 described herein, as well as functions performed by databases 114, 116 and 118 described herein. Such modules and databases are exemplary, and the functions described herein can be performed by one or more of the modules and/or databases alone or in combination, or can be distributed. At process block 302, requests for a media item are received from consumers located in a first geographic area. These requests can come in a variety of forms from a variety of sources and represent media accesses by consumers of media items. The consumers at the first geographic area can utilize a media player such as iTunes, Windows Media Player, the Yahoo! Music Jukebox or any other media player available to request media content from the media provider 106. As previously mentioned, a media access module 108 can be configured to retrieve media from media database 114 and can transmit the media content to the requesting consumer. Process 300 continues to process block 304.

At process block 304, a first plurality of media accesses associated with consumers who requested the media item and who are located in the first geographic area is stored in a media access logs database 118. In one embodiment, the first plurality of accesses is stored in the media access logs database 118 as an entry that includes a consumer identifier, and a media item identifier. Other data associated with each entry can include consumer profile data corresponding to characteristics of the consumer such as age, gender, ethnicity, etc. In addition, further data can include the date and time at which the media content was accessed, the dynamic IP address associated with the consumer computing device 102 from which the request was received, the metadata associated with the media content, etc.

Consumers located in the first geographic area and the second geographic area are determined to be in such geographic areas based on one or more factors indicative of their geographic position. In one embodiment, the geographic area can be always the same for a requesting consumer. Thus, a consumer requesting the media item can have a corresponding user profile in which a zip code of the consumer's address is stored. Such zip code can be utilized to determine the geographic area of the user. For example, if the consumer has the zip code of 90401 in the user profile, then even if the consumer is traveling to a different zip code, the zip code in the user profile, namely 90401, would be used to determine the geographic location of the consumer. Thus, if the consumer travels to Florida and opens a website of the media provider 106, the zip code in the user profile 90401 will be utilized and recorded as if the consumer accessed the media item from zip code 90401.

In another embodiment, depending on the IP address of the computing device 102 that the consumer utilizes to make the request for the media item, the geographic area can be derived as long as the geographic area can be identified from the IP address. For example, the IP address can be dynamically allocated to the consumer computing device 102. If the consumer travels to a different location, the dynamic IP address allocated every time the consumer opens a website of the media provider 106 can be utilized to determine the location of the consumer and therefore have a more accurate representation of where the request was made.

In another embodiment, the plurality of media accesses can be stored in the media access logs database 118 as a number. Process 300 continues at process block 306.

At process block 306, requests for the media item are received from consumers located in a second geographic area. Process 300 continues at process block 308.

At process block 308, a second plurality of media accesses associated with consumers who requested the media item and who are located in the second geographic area is stored in the media access logs database 118. Again, the media accesses can be stored along with the identifier of each consumer as well as the geographic location of each consumer. Process 300 continues at process block 310.

At process block 310, a first graphical representation of the first plurality of media accesses is created for display on a map. The graphical representation is created for display using known techniques for rendering graphics, text and images for visualization on a computing device display such as a computer monitor or cell phone display, for example using a markup language to create a displayable electronic document interpretable by a browser, such as a web page. The graphical representation is communicated to a user of the system via network 104, or if in an alternate embodiment the processing occurs at a user device, the graphical representation is output to the device's display for visual perception by the user. The geographic representation can be displayed in association with the graphical representation of the first geographic representation on the map. The first geographic representation on the map can be displayed in one or more visualization forms. As such, in one example, the graphical representation can be a certain number of pixels corresponding to the number of the first plurality of media accesses. These pixels can be arranged in a geometric shape such as a circle or square. In another example, the graphical representation can be pixels of a certain color related to the number of the first plurality of media accesses. In yet another example, the first graphical representation can be a bar whose height is representative of the number of the first plurality of media accesses. And in yet another embodiment, the first graphical representation can be a portion of a circle that represents the number or the first plurality of media accesses.

The first graphical representation can be displayed in association with the first geographic area on the map. As such, a color-coded region, histogram, pie chart, or any other display can be presented and displayed next to the representation of a city, state or any other geographic location. In one example, the number of media accesses can be represented as a three-dimensional histogram, with bars of varying height displayed next to metropolitan areas in a map. Process 300 continues at process block 312.

At process block 312, a second geographic representation of a second plurality of media accesses is created for display on the map. The second graphical representation can be displayed in association with a graphical representation of the second geographic area on the map. Similar to the first geographical representation, the second geographic representation can be a color-coded region, a histogram, or any other meaningful visual representation of the plurality of media accesses of the media item in the second geographic area.

In one embodiment, the color-coded regions can be displayed in the form of a heat map. In one example, the heat map display is represented by different colors. In another example, the heat map's display can be represented by different types of shading. In yet another example, the heat map's display can be represented by different types of shapes or symbols. If the heat map's display is color-coded, a large number of consumer media accesses can be represented by the color red, and a low number of consumer media accesses can be represented by the color blue.

For instance, if the number of media accesses is higher than one hundred in one geographic area, the corresponding area on the map can be shown with the color red. For example, if the corresponding area on the map is represented by a pixel on a computer screen, such pixel can be configured to display the color red. Furthermore, if the number of media accesses is between fifty and one hundred in a geographic area, the corresponding area on the map can be displayed with the color purple. Finally, if the number of media accesses falls in the range of zero to fifty in a geographic area, the corresponding area on the map can be colored blue. As one skilled in the art can appreciate, various configurations of sizes, colors, shadings, graphic visualizations and/or displays can be utilized to convey the relative difference between the number of media accesses in different geographic areas.

Consumer media accesses can be logged in the media access logs database 118, and be utilized to report media access patterns of consumers. Users requesting such media access patterns can request data regarding media access patterns for one or more purposes. For example, a user can request media access patterns in order to identify data for statistical analysis. In another example, a user can request media access patterns in order to be informed of the media selection in one or more geographic areas, and access the most popular media in such geographic areas. In yet another example, a media producer or artist can request media access patterns to establish the success rate of the media producer or artist or song or video.

Figure 4:
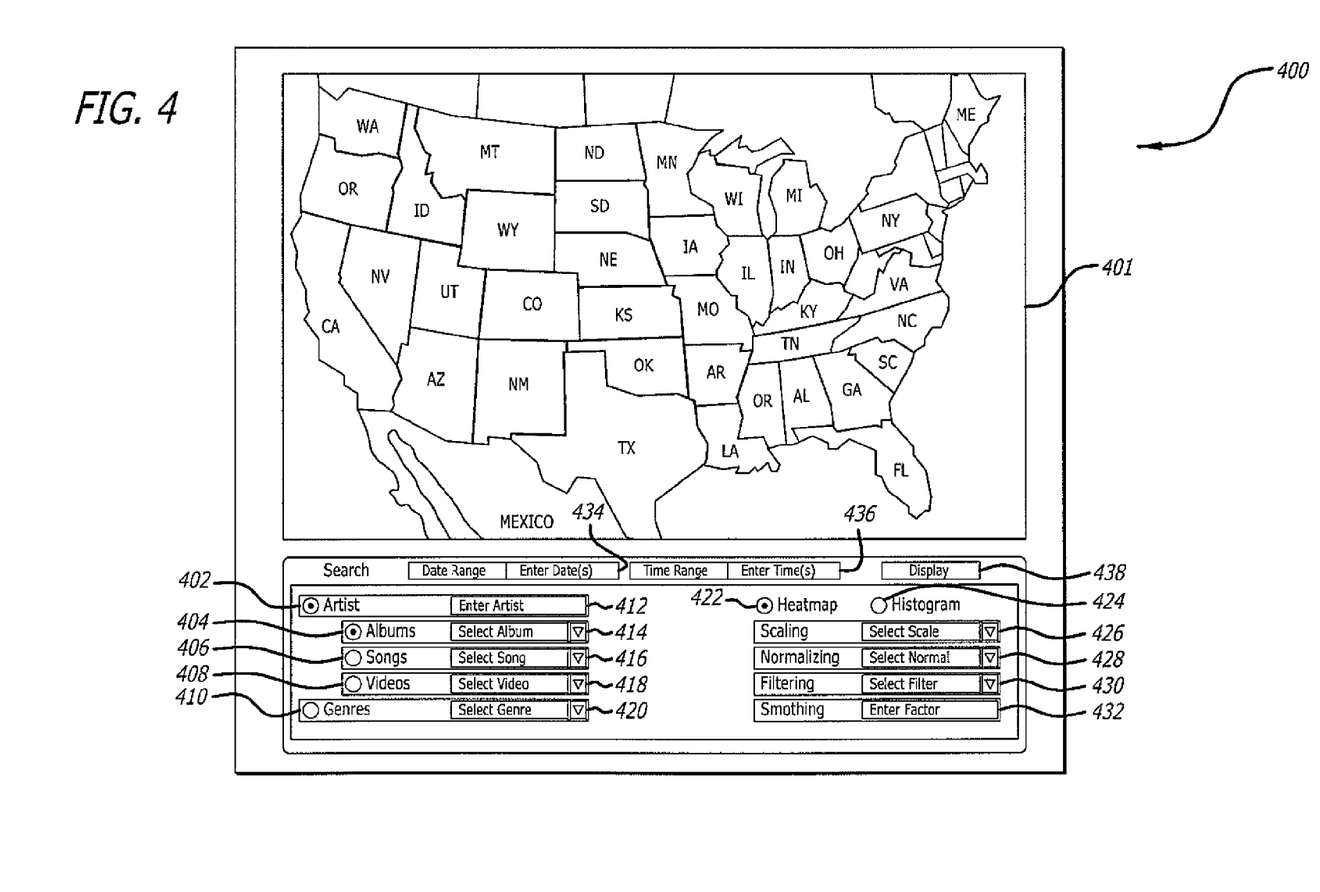
FIG. 4 depicts an exemplary user interface for searching media access patterns in multiple geographic areas.

FIG. 4 depicts an exemplary user interface 400 for searching media access patterns in multiple geographic areas. User interface 400 can include a map 401. In one example the map 401 can illustrate the United States. In other examples, other territories can be illustrated in the map 401. The user can be provided with a search user interface that allows the user to enter search criteria. The search criteria can include media descriptor data that is to be presented in the map 401.

For example, the user can utilize a radio button 402 in combination with a text entry field 412 to generate the visualization of media accesses based on media item parameters, such as the artist of each requested media. A user can enter an artists name to view consumer access to media of the entered artist in multiple geographic locations, or alternatively, the user can select an artist's name from a drop-down list or search for an artist's name via a search box. Thus, once the user selects the radio button 402, the user can also enter an artist's name in the text entry field 412. Once the user enters the artist's name, the map 401 can be populated with media access data that illustrates the geographic areas with higher numbers of requests for media items corresponding to the selected artist and the geographic areas with fewer requests for media items corresponding to the selected artist.

In another embodiment, if radio button 402 has been selected, radio button 404 and drop-down menu 414 can be used if the user wants to visualize media access activity related to a specific album. A user can select an album to view consumer access to media of the selected album in multiple geographic locations. Thus, for example, the artist associated with the album or record label company can select to view consumer media accesses of the artists album. The consumer media accesses can be represented in map 401. Once the album is selected from drop-down menu 414 or entered in a text box, consumer media accesses for the album in multiple geographic areas can be displayed in the map 401. The entries above can also be cascaded or sequential, in that the selection or entry of an artist name results in the presentation of a drop-down menu with albums by that artist. Similar nesting or cascading drop down menus can be used for songs or videos associated with an album or another media item parameter.

In another embodiment, if radio button 402 has been selected, radio button 406 and drop-down menu 416 can be utilized in order to select a visualization of consumer activity based on song requests. A user can select one of the artist's songs to view consumer access to media of the selected song in multiple geographic locations. Thus, for example, the user can select at the drop-down menu 416 a very popular song and visualize in map 401 the geographic areas of the United States that are accessing that particular song with highest frequency, lowest frequency, etc. Similarly, radio button 408 in drop-down menu 418 can allow a user to visualize consumer media access to one of the artist's music videos in one or more geographic areas.

In yet another embodiment, a radio button 410 and a drop-down menu 420 can be utilized to select a music genre, such as rock, country, rap, etc. A user can select a genre to view consumer access to media of the selected genre in multiple geographic locations. Consumer media access can be displayed in multiple areas in map 401. Of course, the examples above are just one set of examples for the types of media access patterns that can be selected for display Other instances of media parameters, such as other metadata can be used as criteria for generating geographic media access patterns as described herein. The disclosure herein can be applied to generate media access patterns for any set of metadata or tags attached to a particular class of media accesses. By way of non-limiting example, in music, one could have chosen other parameters such as year or decade that a song was released. For accessing news stories, one could have chosen other parameters such as topic rather than genre, where instead of a drop-down menu, the user could enter a search term, for example, a country, a celebrity, a political candidate, etc.

A means to choose the format of the data display generated as a result of the search criteria can also be provided to the user. In one embodiment, the user can choose whether to generate a heatmap display, by selecting radio button 422, or histogram display, by selecting radio button 424, as discussed previously. If the heatmap display is selected, multiple parameters for scaling, normalizing and filtering the data can also be provided to the user. In one embodiment, the user can select a scaling type to apply to the data from drop-down menu 426, for example, by square root or logarithm. The logarithmic operation can for example be a natural logarithm, a logarithm of base two, or any other logarithmic base. Both the square root and logarithmic operations allow better viewing of media accesses in geographic areas where the number of users or media accesses is low.

In another embodiment, the user can select a normalization type to apply to the data from drop-down menu 428, for example per capita or per access. The data can be normalized per capita, by dividing the number of consumer media accesses in a given geographic area by the number of users in that area. Geographic areas where the population is high are expected to have a high number of consumer media accesses. Therefore, data from low population areas can be visualized on par with data from high population areas The data also can be normalized per access, by dividing the number of consumer media accesses of a certain subset of media items in a given geographic area by the total number of media accesses in that area. Data from areas of low numbers of total media accesses can be visualized on par with data from areas with high numbers of total media accesses.

In yet another embodiment, the user can select a filtering type to apply to the data from drop-down menu 430, for example, by age or gender. In one embodiment, the user can enter the age or age range into a text input field within the drop-down menu 430. In another embodiment, the user can indicate the gender by selecting male or female within the drop-down menu 430. Other user-interface designs and database queries known to those skilled in the art can be implemented to filter the data by age, gender and other demographic and psychographic parameters singly or in combination.

In yet another embodiment, the user can enter a numeric smoothing factor to apply to the data from text entry box 432 to coalesce adjacent geographic regions to provide a more visually pleasing and readable heat map. For example, if zip codes are used, the centroids of such zip codes can map to thousands of longitude/latitude points. By picking a distance radius (typically in miles), and applying a two-dimensional Gaussian filter to the results for each zip code, a smoother heat map display can be generated.

A means to indicate date and time ranges of the media accesses can also be provided to the user. In one embodiment, the user can select text input field 434 to input a day or date range for the media accesses. If no date is entered, the default is the current day. In another embodiment, the user can select a text input field 436 to input a time or time range for the media accesses. If no time is entered, the default is the time from midnight of the earliest day indicated to 11:59:59 pm of the latest day indicated, or the current time, whichever is earliest. Other user-interface designs known to those skilled in the art can be implemented to input dates, such as calendar day pickers, and times, such as digital clock spinners.

Once the user selects one or more search criteria, display formats and data manipulations for displaying media accesses, the user can select display button 438 in order to view on the map 401 the media access patterns in the form of a heat map or histogram as discussed previously. One skilled in the art will recognize that other types of searching can be possible and are contemplated as part of searching for media accesses for data visualization.

Figure 5:
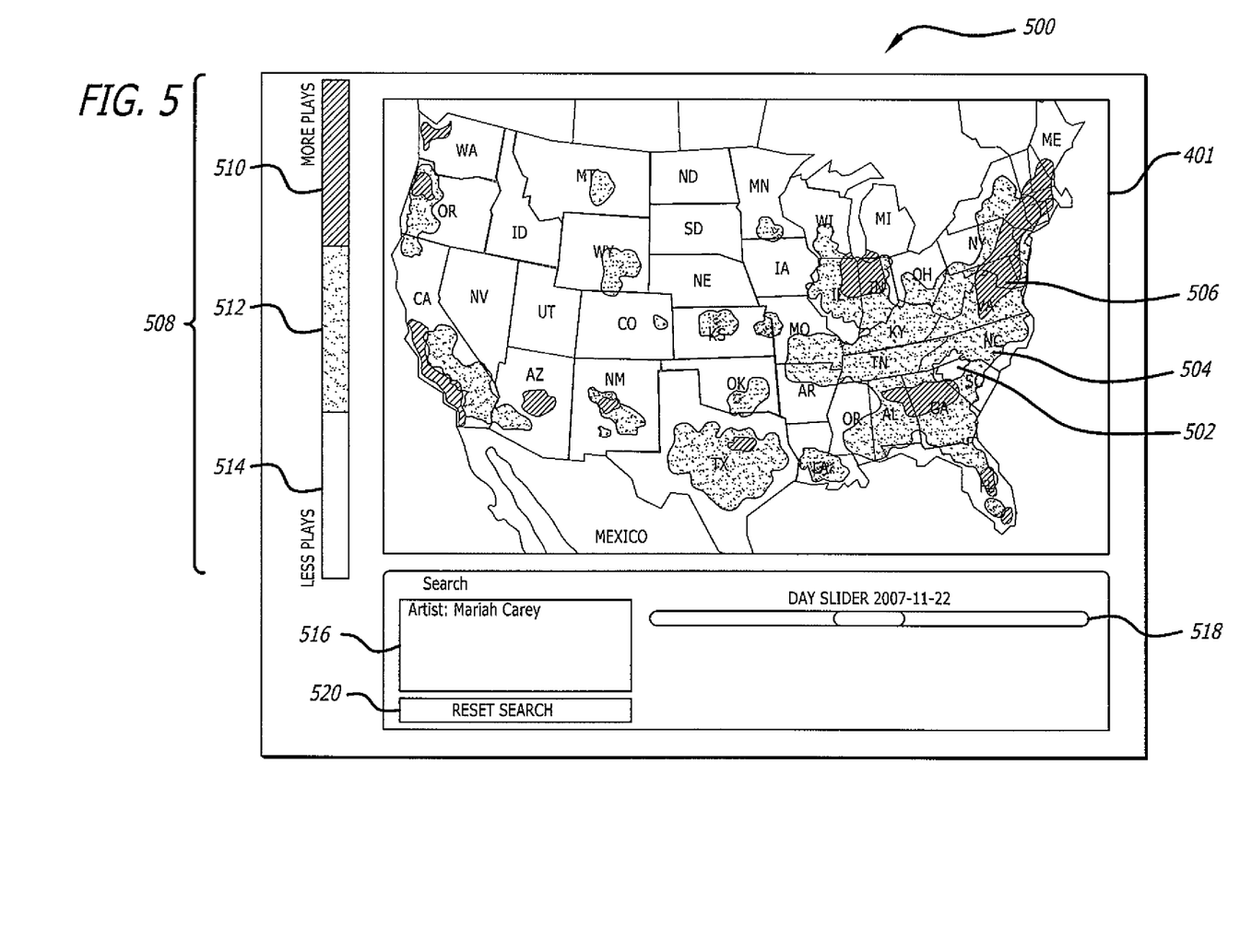
FIG. 5 depicts an exemplary user interface for viewing access patterns as a heat map.

FIG. 5 depicts an exemplary user interface for viewing access patterns as a heat map. User interface 500 displays the map 401 with shaded areas, intended to represent colored areas according to the frequency of media accesses in a geographic area, which can be illustrated with a legend indicator 508, in which a first shade or color 514 represents one end of a scale, in the example depicted "less plays," and another shade or color 510 represents the other end of the scale, in the example depicted "more plays," with intermediate shade/color 512 representing a middle range. Colors or shades can be chosen as a matter of design choice. As such, the legend indicator can show a shade (if monochrome) or color 514 that is displayed in geographic area 502. Such shade/color can illustrate, for example, that there is a low number of media accesses in area 502. Likewise, color 512 can be displayed in geographic area 504. Such color can illustrate that there is a medium number of media accesses in area 504. In another example, shading 510 can be displayed in geographic area 506, where the number of media accesses is very high. In this instance, without any scaling, normalization, filtering or smoothing, higher frequencies of media accesses for popular artists tend to correspond to denser centers of population, such as around metropolitan areas.

User interface 500 further provides a slider 518. The slider 518 permits a viewer to view media access patterns according to the date indicated by the slider 518. For example, the slider 518 can be a date slider. In another example, the slider 518 can be a time of day slider. In yet another example, the slider 518 can be a month slider. In an embodiment, the slider can be automated to loop through a time or date range as an animation to show the change in accesses over time. To conserve processing power, this change over time can be processed at a service provider server or processor and output to a user as a series of animated graphic images or streaming video frames without the need to run the underlying reporting software for each request. Alternatively, the heat map or other display format can be processed at a preselected time and then output as a static image once in a time period (e.g. once per day) and calculated for use in such web applications as a "buzz" indicator for a "hot" genre, song, artist, or video. A service provider can push the static map image to a group of subscribers (via email for example) who wish to be notified about the activities of a particular song or artist, or to one or more user's social network pages, web widgets or other web-based locations, or desktop applications, where a user might want to receive and display such information.

As illustrated in FIG. 5, the slider 518 is a date slider that indicates the media access activity on Nov. 22, 2007. Additionally, user interface 500 can further display the search criteria entered by the user. As such, a display 516 can include the details of the search criteria being displayed on map 401. For example, if the user selected the artist to be Mariah Carey, display 516 can display the name of the artist and any other information. In addition, map 401 illustrates that in geographic area 504, there is a large number of media accesses wherein the artist is Mariah Carey. In addition, the map 401 further illustrates that the geographic area 506 has a medium number of media accesses wherein Mariah Carey is the artist. Further, area 502 has a low number of media accesses wherein the artist is Mariah Carey, and therefore is shaded with shading 514, which is indicative of a low frequency of media accesses. A reset button 520 allows a user to reset the search and enter another set of search criteria for media access patterns.

Figure 6A:
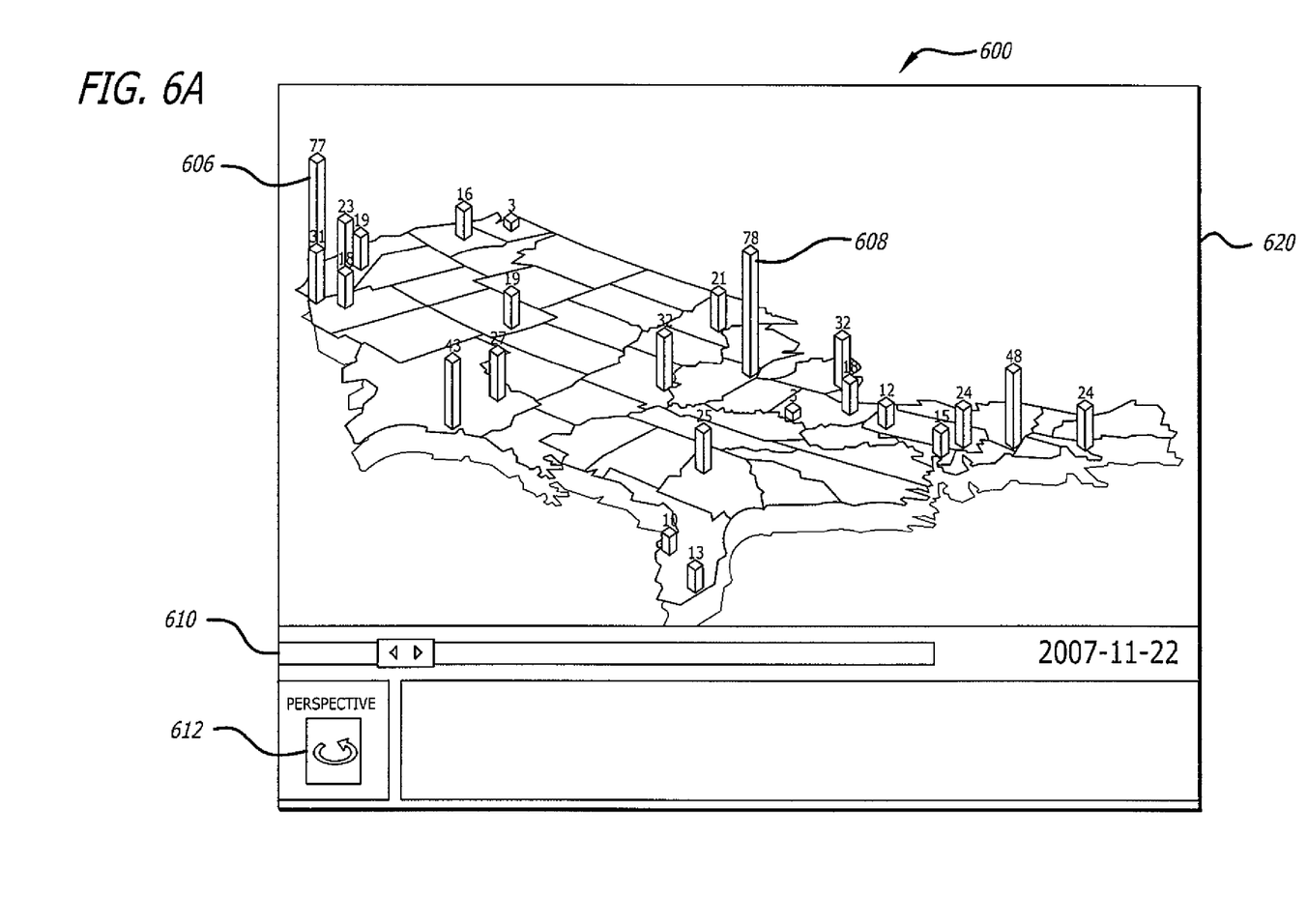
FIG. 6A depicts an exemplary user interface for viewing access patterns as a histogram.

FIG. 6A depicts an exemplary user interface for viewing access patterns as a three-dimensional histogram. A map 620 can be displayed to show three-dimensional vertical bars corresponding to major metropolitan areas of the United States or other country or region, or cities or towns within a state. As such, based on the search entered by the user in user interface 400, a histogram can be displayed showing the media accesses for multiple metropolitan areas. For example, a histogram bar 606 can be displayed with the number 77 which is indicative of the number of media accesses for the specific media item in the Los Angeles metropolitan area on a given date. In another example, the histogram bar 608 can be displayed with a number 78, which shows that there were 78 media accesses in the Chicago metropolitan area. Hovering or clicking on areas of the heat map described above, or on a histogram bar, in an embodiment, will result in further information being displayed in a pop-up or dialog box or other display region, such as the name of the city, the zip code represented, its population, access counts or other information.

In addition, user interface 600 can also be displayed with a slider 610 that allows a user to slide back and forth to view media accesses in different times or dates. Furthermore, user interface 600 also provides a perspective button 612 that allows the map 620 to be rotated such that the user can see the map of the multiple geographic areas from different perspectives.

Figure 6B:
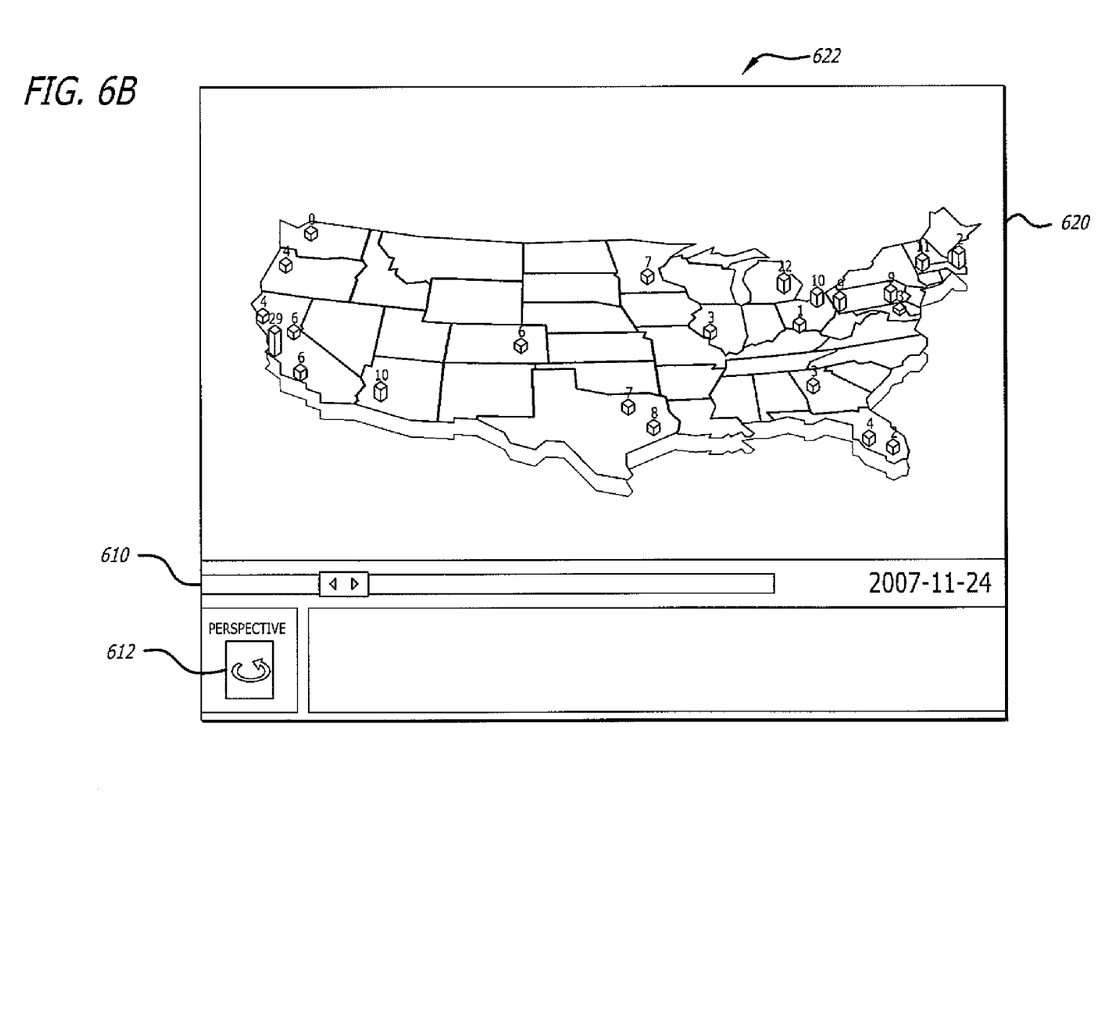
FIG. 6B depicts an exemplary user interface for viewing access patterns as an alternate view of a histogram.

FIG. 6B depicts an exemplary user interface for viewing access patterns as another view of a histogram. As depicted in user interface 622, the map 620 is viewed from a different perspective and with a different date in the date slider 610. As such, the corresponding histogram bars for each of the metropolitan areas can vary according to the date or time selected by the user.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware, software or firmware, and individual functions, can be distributed among software applications at either the client or server level or both. In this regard, any number of the features of the different embodiments described herein can be combined into single or multiple embodiments, and alternate embodiments having fewer than or more than all of the features herein described are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features, functions and interfaces, and those variations and modifications that can be made to the hardware, software or firmware components described herein as would be understood by those skilled in the art now and hereafter.

The invention claimed is:

1. A method comprising:
   logging, via a computing device, access data in a media access log representing a first plurality of media accesses associated with consumers who requested a media item and who are located in a first geographic area;
   logging, via the computing device, access data in the media access log representing a second plurality of media accesses associated with consumers who requested the media item and who are located in a second geographic area;
   processing, via the computing device, the access data in response to request by a user for a visual representation of the consumers' media accesses, wherein said processing comprises filtering the access data in the media access log based upon filtering criteria selected by the user and normalizing the access data by computing consumer access information in the first geographic area and the second geographic area; and
   communicating data over a network for visual rendering on a display of a user device associated with the user, said visual display data when rendered visually displays on a map a first graphical representation of the first plurality of media accesses, the first graphical representation being displayed in association with a graphical representation of the first geographical area on the map, and a second graphical representation of the second plurality of media accesses, the second graphical representation being displayed in association with a graphical representation of the second geographical area on the map.

2. The method of claim 1, wherein the first graphical representation and the second graphical representation comprise a histogram.

3. The method of claim 1, wherein the first graphical representation and the second graphical representation comprise a heat map.

4. The method of claim 3, wherein the heat map is displayed with the first graphical representation in a first color if a number of the first plurality of media accesses falls within a first range, the heat map being displayed with the first graphical representation in a second color if the number of the first plurality of media accesses falls within a second range.

5. The method of claim 3, wherein the heat map is displayed with the second graphical representation in a first color if the number of the second plurality of media accesses falls within a first range, the heat map being displayed with the second graphical representation in a second color if the number of the second plurality of media accesses falls within a second range.

6. The method of claim 1, further comprising providing the media item to the consumers who are located in the first geographic area, and providing the media item to the consumers who are located in the second geographic area.

7. The method of claim 1, further comprising determining whether a consumer from the plurality of consumers is associated with the first geographic area if an Internet address associated with a computing device being utilized by the consumer corresponds to the first geographic area.

8. The method of claim 1, further comprising determining whether a consumer from the plurality of consumers is associated with the second geographic area if an Internet address associated with a computing device being utilized by the consumer corresponds to the second geographic area.

9. The method of claim 1, further comprising determining whether a consumer from the plurality of consumers is associated with the first geographic area if a profile of the consumer includes geographic data related to the first geographic area.

10. The method of claim 1, further comprising determining whether a consumer from the plurality of consumers is associated with the second geographic area if a profile of the consumer includes geographic data related to the second geographic area.

11. The method of claim 1, wherein the processing step further comprises:
    determining a number of accesses to the media item in each of the first and second geographic areas over a time period.

12. The method of claim 1, wherein the first and second geographic areas represent zip code areas.

13. The method of claim 12, wherein the processing step further comprises applying a two-dimensional Gaussian filter to said access data.

14. The method of claim 1, wherein the processing step further comprises scaling the access data.

15. The method of claim 1, wherein the processing step and the communicating step are performed at preselected times, and the visual display data comprises a static image.

16. A method comprising:
    storing data in storage representing a first plurality of media accesses associated with consumers who requested the media item and who are located in a first geographic area;
    storing data in said storage representing a second plurality of media accesses associated with consumers who requested the media item and who are located in a second geographic area;
    outputting, via a computing device, an image displaying on a map a first graphical representation of the first plurality of media accesses, the first graphical representation being displayed in association with a graphical representation of the first geographical area on the map and based upon filtering criteria selected by a user and normalizing by computing consumer access information in the first geographical area; and
    outputting, via the computing device, an image displaying on the map a second graphical representation of the second plurality of media accesses, the second graphical representation being displayed in association with a graphical representation of the second geographical area on the map and based upon filtering criteria selected by the user and normalizing by computing consumer access information in the second geographical area.

17. The method of claim 16, wherein the first graphical representation and the second graphical representation comprise a histogram.

18. The method of claim 16, wherein the first graphical representation and the second graphical representation comprise a heat map.

19. The method of claim 1 further comprising gathering demographic information about the consumers and utilizing the demographic information in said processing step as part of a filtering process so as to tailor the processing of the access data according to selected consumer demographic information.

20. A system for presenting media access patterns to a user, comprising:
a plurality of processors;
a logging module implemented by at least one of said plurality of processors that stores in a media access logs database data relating to a first plurality of media accesses associated with consumers who requested the media item and who are located in a first geographic area, the logging module further configured to store in the media access logs database data relating to a second plurality of media accesses associated with consumers who requested the media item and who are located in a second geographic area; and
a user interface module implemented by at least one of said plurality of processors that communicates, for visual display on a user device, a map depicting a first graphical representation of the first plurality of media accesses, the first graphical representation being displayed in association with a graphical representation of the first geographical area on the map and based upon filtering criteria selected by a user and normalizing by computing consumer access information in the first geographical area, and a second graphical representation of the second plurality of media accesses, the second graphical representation being displayed in association with a graphical representation of the second geographical area on the map and based upon filtering criteria selected by the user and normalizing by computing consumer access information in the second geographical area.

21. The system of claim 20, further comprising a media database and a media access module, the media access module communicating with the logging module to pass access data to the logging module concerning media accesses from said media database.

22. The system of claim 21, further comprising a consumer profiles database storing demographic information about consumers having access to the system, the consumer profile database being in communication with the logging module and a reporting module, such that the reporting module can process the access data and the consumer demographic information for building the map to be communicated by the user interface module.

23. A user interface for visibly displaying media access patterns on a display of a computing device, comprising:
a map that displays a first graphical representation of a first plurality of media accesses associated with consumers in a first geographic area of the map, the first graphical representation being displayed in association with a graphical representation of the first geographical area on the map and based upon filtering criteria selected by a user and normalizing by computing consumer access information in the first geographical area, thereby depicting a media access pattern of consumers in the first geographic area; and
the map display further comprising the display of a second graphical representation of a second plurality of media accesses associated with consumers in a second geographic area, the second graphical representation being displayed in association with a graphical representation of the second geographical area on the map and based on filtering criteria selected by the user and normalizing by computing consumer access information in the second geographical area, thereby depicting a media access pattern of consumers in the second geographic area.

24. The user interface of claim 23, further comprising a user input area via which a user can select the first graphical representation and the second graphical representation to be displayed as histograms.

25. The user interface of claim 23, further comprising a user input area via which a user can select wherein the first graphical representation and the second graphical representation to be displayed as a heat map.

26. The user interface of claim 23, further comprising a slider that permits a user of the interface to select a period of time in which the first plurality of media accesses and the second plurality of media accesses took place.

27. The user interface of claim 23, further comprising an input area via which a user can elect to view the consumer media access patterns of consumers in relation to a particular media item.

28. The user interface of claim 23, further comprising an input area via which a user can elect to view the consumer media access patterns of consumers in relation to a particular media item genre.

29. The user interface of claim 23, further comprising an input area via which a user can elect to view the consumer media access patterns of consumers in relation to a particular media item parameter.

30. The user interface of claim 23, further comprising an input area via which a user can elect to view the consumer media access patterns of consumers in accordance with an elected filtering technique.

31. The user interface of claim 24, further comprising a user input area via which the user can alter the perspective at which the map is displayed.

* * * * *